United States Patent

[11] 3,557,651

| [72] | Inventor | Lewis R. Byrley<br>Highland, Ind. |
|---|---|---|
| [21] | Appl. No. | 786,116 |
| [22] | Filed | Dec. 23, 1968 |
| [45] | Patented | Jan. 26, 1971 |
| [73] | Assignee | United States Gypsum Company<br>Chicago, Ill.<br>a corporation of Delaware |

[54] FILM-CUTTING APPARATUS
10 Claims, 7 Drawing Figs.

[52] U.S. Cl. ................................................. 83/303,
83/308, 83/314, 83/319
[51] Int. Cl. ..................................................... B23d 25/04
[50] Field of Search ......................................... 83/294,
303, 314, 319, 308

[56] References Cited
UNITED STATES PATENTS
2,163,967  6/1939  Strawn et al. .................. 83/294X 3,199,554  8/1965  Thedick ........................ 83/294X
3,292,472  12/1966  McKenica ..................... 83/294
3,469,484  9/1969  Diolot .......................... 83/294

*Primary Examiner*—Frank T. Yost
*Attorneys*—George E. Verhage, John Kenneth Wise and Lois M. Dierstein

ABSTRACT: A reciprocally movable carriage assembly axially drives laterally movable, film-cutting knives disposed above axially moving discrete boards covered on their upper surfaces by a continuous plastic film or sheet. A spring-loaded catch connected to the carriage and biased against a board undersurface engages the interval between two boards whereafter the carriage assembly is driven by the moving boards. The cutting knives in the course of carriage movement drop between said two boards thereby penetrating the plastic film, and are cammed outwardly toward opposed longitudinal film edges thereby transversely cutting the film covering the boards.

PATENTED JAN 26 1971
3,557,651
SHEET 1 OF 3
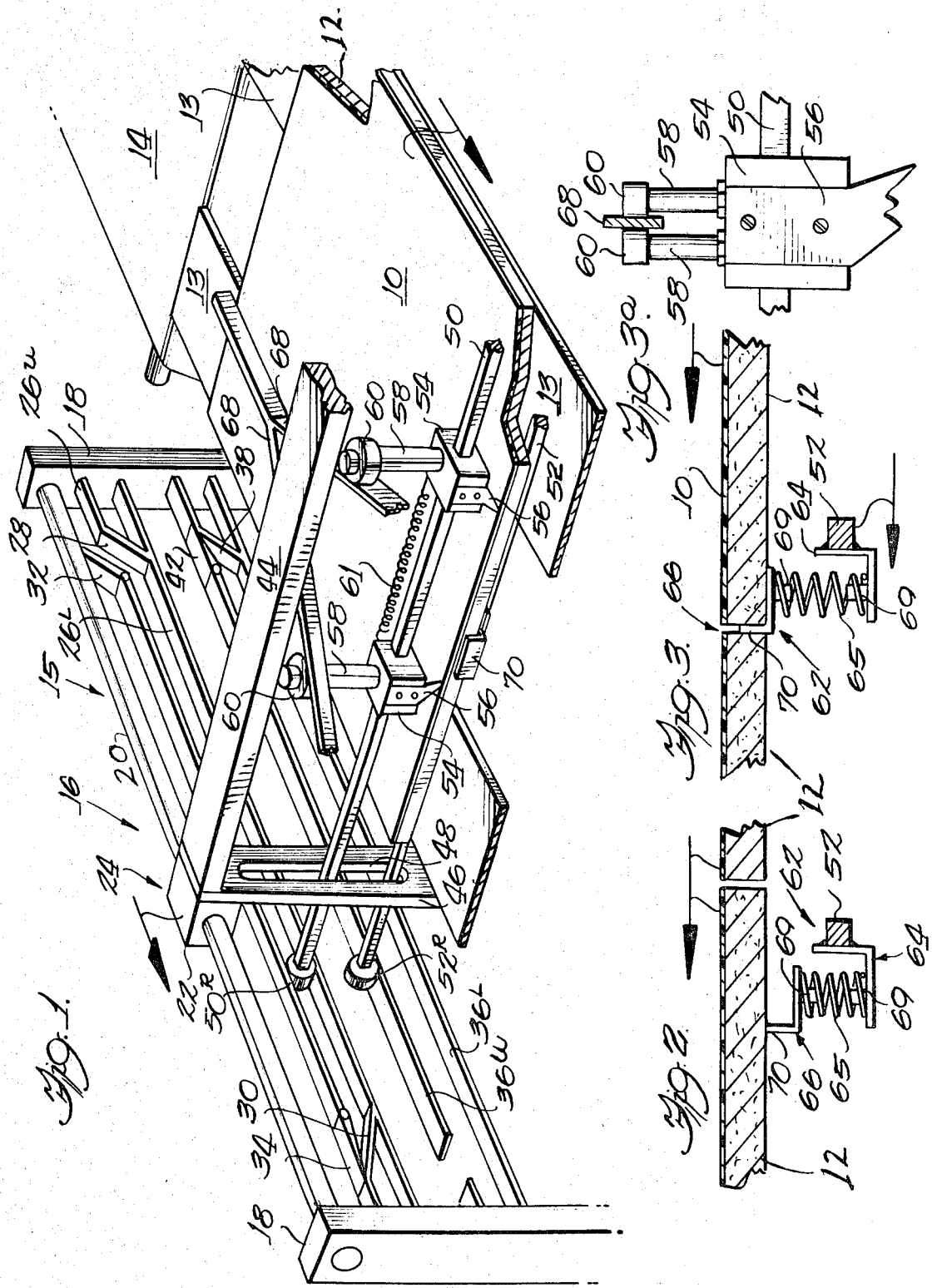
Inventor
Lewis R. Byrley
by Pendleton, Neuman
Seibold & Williams
Atty's

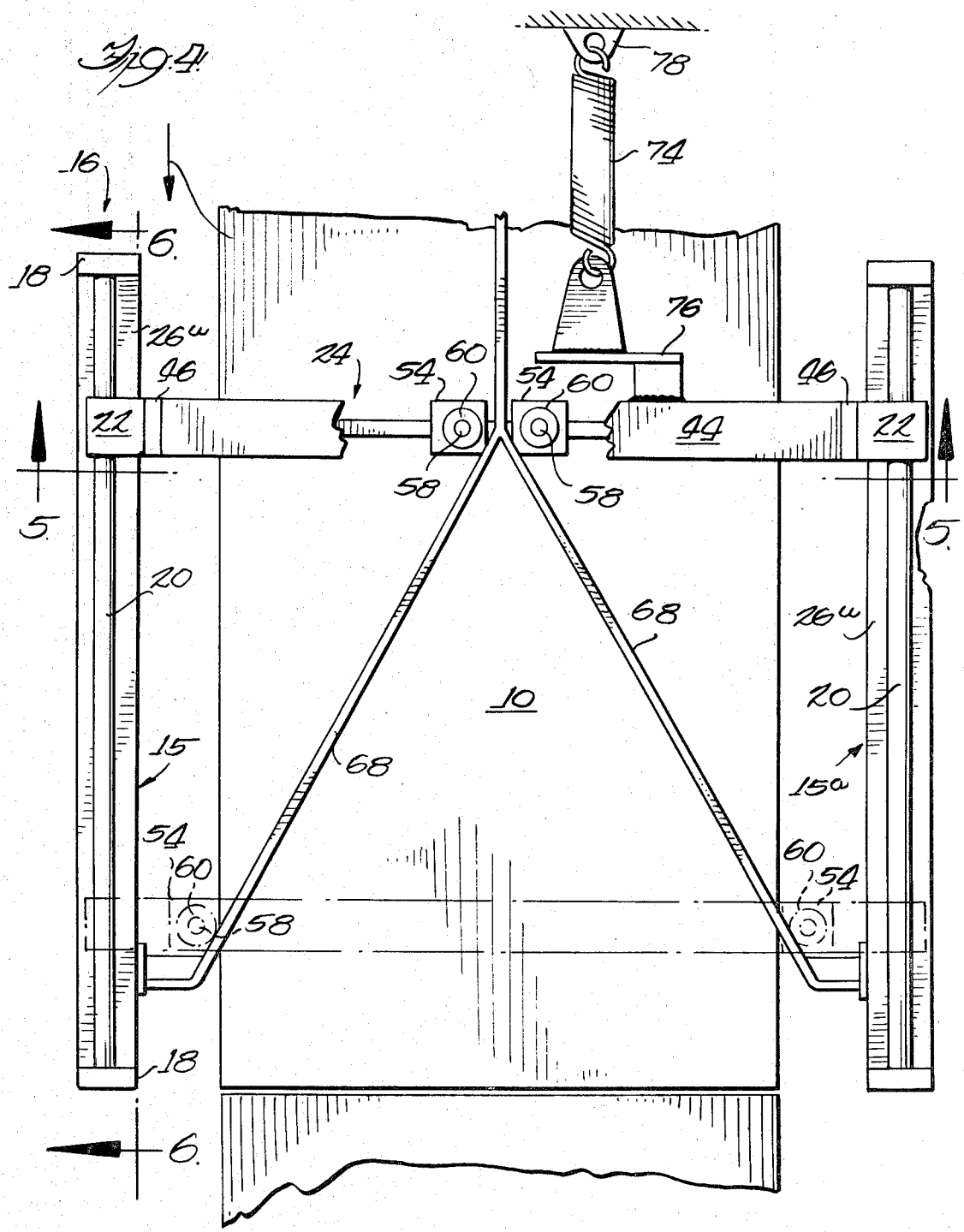

3,557,651

FILM-CUTTING APPARATUS

BACKGROUND OF THE INVENTION

This invention relates to apparatus for transversely severing a continuous film overlying and connecting successive, spaced sections of substrates such as wallboards or the like which are continuously advanced by a conveyor belt or the like.

More particularly, the invention relates to a film-cutting apparatus having a reciprocating carriage assembly supported by guide portions of spaced assemblies which may be mounted on the frame of an endless conveyor belt. The carriage is periodically driven in the forward direction by the advancing wallboards to effect the transverse cutting of the overlying film connecting such wallboards which are continuously advanced at linear speeds of up to about 50 feet per minute by the conveyor.

The use of decorative plastic films such as vinyl films having a wood grain appearance on the surface of gypsum wallboards is well known in the art. Such wallboards having a paper facing are formed from a continuous strip, and following cutting of such strip into boards of desired length and drying such resulting boards in a kiln, they may be transferred in closely spaced end-to-end relation onto a conveyor. In the course of movement thereon, such boards have an adhesive and a decorative plastic facing applied to the upper planar surfaces thereof.

Guillotine blades, cutting wires, saws and bladed rotary wheels have proven unsatisfactory for precisely severing such overlying elastic covering material, such as a vinyl sheet, connecting and concealing the interval between sections of wallboards being conveyed on a moving belt. Past attempts to sever the film between wallboards with a guillotine device having either a straight edge or a saw-toothed edge have not produced a clean and uniform edge on the cut plastic film, and wrinkling and uneven edges of the film resulted. Of the past attempts, the most successful method of cutting employed manual labor and required two slitters. The slitters were disposed on opposite sides of the web and simultaneously manually cut the web by means of knives from a web central point to the outer edges. This method, while producing a clean and uniform edge, was costly.

In accordance with this invention a reciprocally movable carriage employs a draw bar having a spring-loaded catch mounted thereon which is insertable into the interval between adjacent wallboards axially moving along a predetermined path. The catch engages the leading edge of a wallboard, and as a result, the drawbar and catch together with the entire carriage assembly are driven by the engaged wallboard as the same are axially moved.

As the carriage is driven, overlying film-severing knives aligned with the catch in the vertical plane pierce the film covering the boards and are then laterally cammed outwardly across the width of the film. After the knives have severed the film, the catch is removed from engagement with the driving wallboard and the entire carriage assembly quickly returned to a starting station to enable the catch to engage the interval between the following two wallboards moving along the axial path.

It is an object of this invention therefore, to provide a film-cutting apparatus actuated by continuously advancing sections of wallboards which are covered by a continuous plastic strip and which are adapted to transversely sever the film between said sections of wallboard in the course of board movement.

It is a further object of this invention to provide a film-cutting apparatus which functions automatically, without the need of a human agency, to sever the continuous film portions disposed over spaced wallboards while moving along an axial path.

It is another object of this invention to provide a film-cutting apparatus having a drawbar and catch assembly which enables the apparatus to be actuated by boards driven by a moving conveyor while simultaneously functioning to locate cutting knives disposed above such catch assembly.

The above and other objects of this invention will become more apparent from the following detailed description when read in the light of the accompanying drawings and the appended claims.

DESCRIPTION OF THE DRAWINGS

FIG. 1 is a fragmentary perspective view of a film-cutting apparatus made in accordance with this invention;

FIG. 2 is a fragmentary view illustrating a catch assembly of the apparatus of FIG. 1 in engagement with the undersurface of a moving wallboard member;

FIG. 3 is a fragmentary sectional view similar to FIG. 2, in which the catch member has been received in the interval between two adjacent wallboard members;

FIG. 3-A is an enlarged fragmentary view of a modified knife holder which may be employed of the apparatus of FIG. 1;

FIG. 4 is a top plan view of a film-cutting apparatus made in accordance with this invention;

DESCRIPTION OF THE INVENTION

Figure 5:
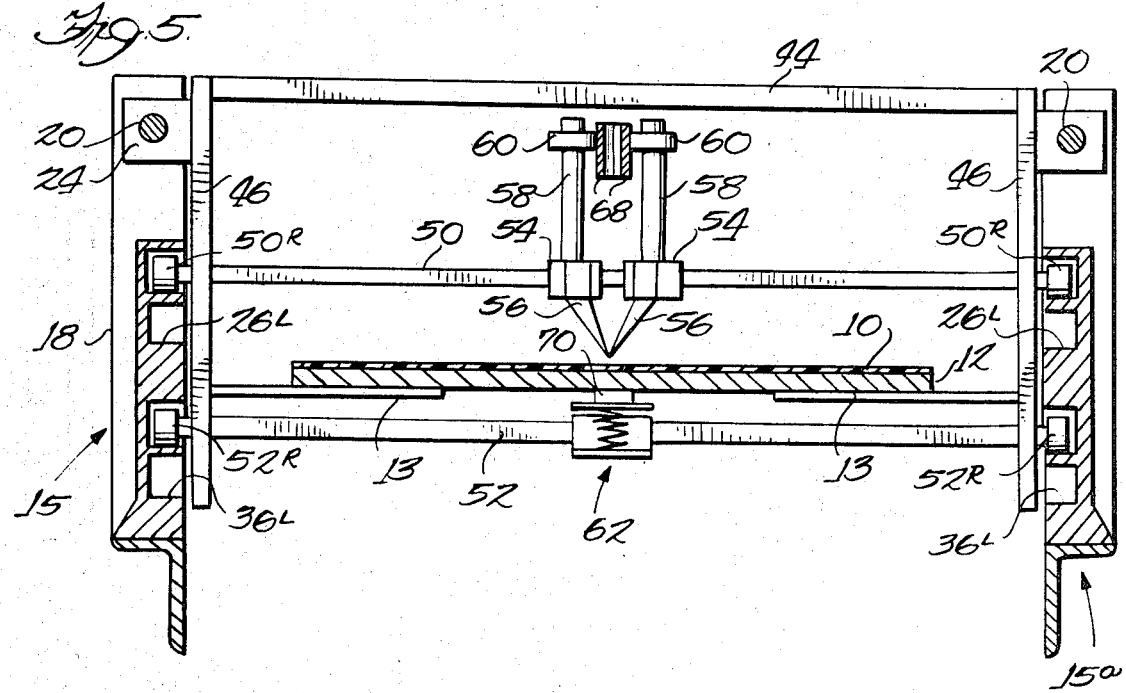
FIG. 5 is a sectional view taken along line 5–5 of FIG. 4.

Referring now more particularly to FIG. 1, a continuous plastic sheet 10 is therein illustrated which has been adhesively secured to the upper surfaces of adjacent wallboard members 12 being conveyed from continuous conveyor belt member 14 over spaced slide plates 13 in the direction of movement indicated by the arrow in FIG. 1. In accordance with procedures which are well known in the art, gypsum wallboard such as the wallboards 12 of FIG. 1 may be placed on a continuous conveyor such as illustrated conveyor 14, and in the course of moving on such conveyor an adhesive applicator will apply an adhesive layer to the upper surfaces of such wallboards. Downstream of such adhesive applicator a film which may be formed of vinyl plastic or the like, is rolled onto the upper surfaces of the moving wallboards in the form of a continuous strip.

The wallboards 12 have been placed on a conveyor 14 of FIG. 1 in end-to-end relationship, and in accordance with this invention it is desired that the interval between adjacent ends of such wallboards be approximately ⅛inch. The desired axial alignment and spacing between wallboards 12 may be effected by the use of guide bars and spacer rods or equivalent means which assure the desired ⅛inch gapping between adjacent board ends in a manner well known in the art.

It is the purpose of the film-cutting apparatus 16 illustrated in FIG. 1 to automatically sever the continuous plastic surfacing 10 at intermittent transverse intervals between adjacent boards 12 moving from the continuous belt 14 over plates 13. Although many expedients have been employed in the past in an attempt to satisfactorily effect slitting of a continuous film applied to spaced wallboard members moving in a continuous stream, the only method which had been found satisfactory necessitated the employment of two operators who manually effected transverse slits as the moving boards proceeded along an axial path.

The slitting of the continuous film 10 overlying and adhesively secured to two adjacent boards 12 is effected in the interval defined by opposed vertical stanchions 18 illustrated in FIG. 1. Mounted between the stanchions is a horizontal guide rod 20 adapted to slidably engage bearing block 22 of a carriage assembly 24. Guide rod 20 comprises one horizontal guiding element of a guide assembly 15, an opposed twin guide assembly 15a being arranged parallel to the assembly 15 of FIG. 1 on the opposite side of the slide plates 13 illustrated, as is more apparent from FIGS. 4 and 5. Also mounted between vertical stanchions 18 and arranged parallel to guide rod 20 and beneath the same are a pair of track members 26u and 26l which are connected by inclined ramp members 28 and 30. Disposed above ramp members 28 and 30 are a normally open gate member 32 and a normally closed gate member 34, respectively. Each of the latter gate members is pivotally mounted on a transverse pin member whereby gate 32 might pivot downwardly from its normal upward position illustrated in FIG. 1 and gate member 34 may pivot upwardly from its normal closed position illustrated in FIG. 1.

Disposed parallel to guide rod 20 and the two tracks 26u and 26l between vertical stanchions 18 are underlying track members 36u and 36l connected by inclined ramp member 38. A normally closed, pivotally mounted gate member 42 is disposed above inclined ramp 38.

It is the function of the two guide rods 20, only one of which is illustrated in FIG. 1, to be slidably engaged by opposed bearing blocks 22 of the reciprocally movable carriage assembly 24 fragmentarily illustrated in FIG. 1. Bearing blocks 22 of the carriage assembly 24 join transverse support beam 44 from which depend spaced yoke members 46. Each yoke member 46 has a vertical elongate slot 48 clearly shown in FIG. 1. It is the function of the spaced yokes 46 to maintain transversely extending knife bar 50 and underlying transversely extending drawbar 52 in vertical alignment, and to render the latter bar members movable simultaneously with the movement of the remaining portions of the reciprocating carriage assembly 24.

Transversely movable along knife bar 50 are spaced knife holders 54 to which are detachably connected as by screw members or the like, knives 56. The knives are adapted to transversely slit the overlying continuous plastic film 10 at the intervals between adjacent wallboard members 12. Also connected to knife-holder blocks 54 which slidably move along the length of knife bar 50 are vertical pin members 58 which engage rotatable cam followers 60 at their end portions as illustrated in FIG. 1. Spring 61 serves to draw the opposed cams together.

Supported by drawbar 52 is a spring-loaded catch assembly 62 more clearly illustrated in FIGS. 2 and 3. Catch assembly 62 comprises a base channel section 64 joined to the drawbar 52 as by welding or the like, above which is mounted a reciprocally movable channel Section 66. Section 66 is connected to portion 64 by means of coil spring 65 engaging pins 69 attached to the channel portions 64 and 66. Catch section 66 has a vertically extending terminal portion 70, the function of which will hereafter be explained in greater detail.

In the normal course of operation, carriage assembly 24 is disposed at the upper end limits of the guide assemblies 15 and 15a as viewed in FIG. 4, adjacent the right-hand vertical stanchion 18 as viewed in FIG. 1. It will be apparent that in this latter position rollers 50r of knife bar 50 will be disposed on upper track member 26u after having moved up inclined ramps 28 from the position illustrated in FIG. 1. Also, rollers 52r engaging opposed end limits of drawbar 52 will be disposed at top track members 36u after having moved over inclined ramps 38 from the lower track members 36l, and in the course of so doing, pivotally move gate members 42 upwardly.

With the carriage assembly 24 in the starting position with knife bar 50 on track members 26u and drawbar 52 on track members 36u, the knife holders 54 and knife members 56 suspended thereby will be in adjacent relationship with the tips of the knives in contact, in the manner illustrated in FIG. 5. As is most apparent from the top plan view of FIG. 4, camming strips 68 force cam followers 60 and attachments to diverge, as the carriage assembly moves to the left in the direction of the arrow in FIG. 1 from the starting position above described in which the carriage assembly is adjacent the right-hand vertical stanchion 18. Although spring 61 is illustrated for urging the knife blocks 54 together, each knife block may be employed in conjunction with a pair of cam follower rollers 60 and pins 56 which engage opposed surfaces of the cam strips 68 as illustrated in FIG. 3A, dispensing with the need for spring 61.

Figure 6:
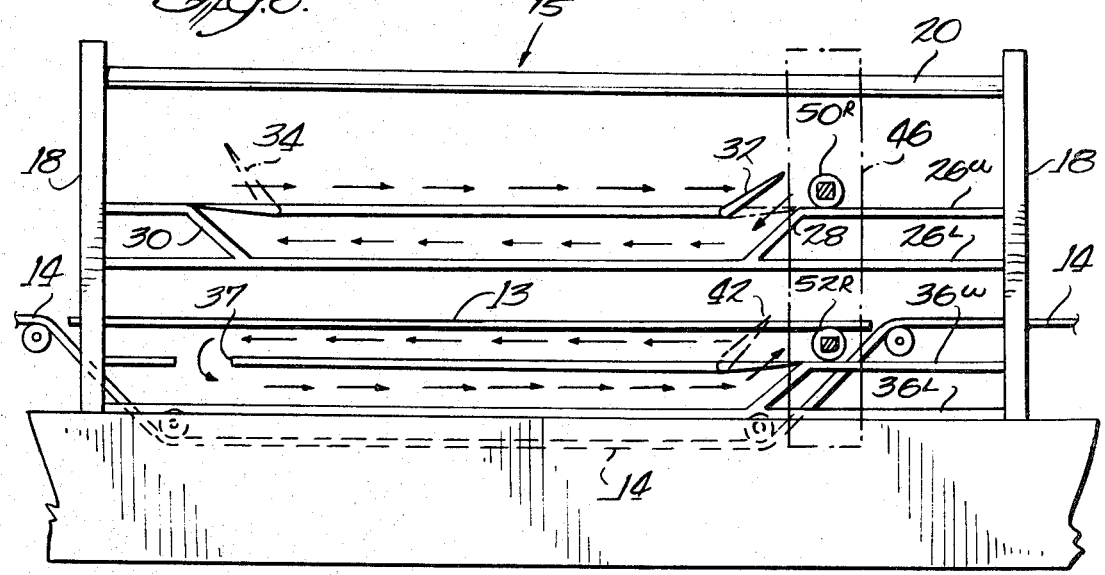
FIG. 6 is a view taken along line 6–6 of FIG. 4.

With carriage assembly 24 at the starting position above described, catch portion 70 of the catch assembly 62 will be disposed against the undersurface of an axially moving wallboard member 12, between slide plates 13, in the manner illustrated in FIG. 2. It will be noted from FIGS. 1 and 6 that the surface of conveyor 14 drops to a lower level beneath the path traversed by the movable carriage 24 of the cutting apparatus. The belt depression beneath plates 13 illustrated most clearly in FIGS. 1 and 6 is necessary to enable the catch assembly and drawbar to depend beneath the plane of the conveyor belt 14 so that the catch portion 70 may function to slidably engage the undersurface of a moving wallboard member as illustrated in FIG. 2. The spaced slide plate members 13 illustrated in FIGS. 1 and 6 may be interposed between the spaced level portions of the continuous conveyor belt 14 employed for purposes of axially guiding the wallboard members 12 having a continuous plastic strip adhered to the upper surfaces thereof. Since in the initial position of the carriage assembly the catch assembly will be disposed in the interval between the parallel slide plate members 13, neither the continuous conveyor 14 nor the slide plate members will interfere with the movement of the drawbar and attached catch assembly 62.

Referring to FIG. 3, a condition is therein illustrated in which the terminal catch portion 70 of the catch assembly 62 has snapped into the interval between adjacent wallboard members 12 interconnected by the continuous covering plastic strip 10. The locking action is made possible by means of the coil spring 68 which resiliently urges the terminal catch portion 70 into the upward direction.

Upon being disposed in the interval between adjacent connected wallboard members 12, the entire carriage assembly will be moved to the left as illustrated in FIG. 1 with the rearwardly disposed wallboard 12 constituting the driving force. Inasmuch as each wallboard member is of great weight and has a dimension approximating 4' × 10' or 4' × 12', the resistance afforded by the entire carriage assembly 24 is rather insignificant so as to have no misaligning effect on the wallboard member as the same moves in position on the conveyor 14 and over plates 13. Since the interval between the spaced portions of conveying belt 14 spanned by the slide plates 13 is a fraction of the length of each wallboard 12 carried by the continuous belt 14, each wallboard will be driven at all times by a continuous conveyor portion, and there is no possibility of a wallboard member being stalled in a position of rest over the slide plates.

Referring to FIG. 6, it will be seen that as the carriage assembly moves to the left, rollers 50r of the knife bar 50 will proceed down ramps 28 to the lower track members 26l resulting in the dropping of the two knives 56 most clearly seen in FIG. 5. It will also be noted from this latter FIG. that the distance between the two tracks 26u and 26l in the vertical plane is such that as the knives drop with the knife bar, the points of the knives will penetrate the plastic covering 10 over the wallboards 12. As the knife bar 50 continues to move in an axial direction to the left as illustrated in FIG. 1, cam strips 68 most clearly seen in FIG. 4 will force the two knives 56 to proceed outwardly, away from each other, toward opposed longitudinal edges of the sheet 10. Such camming action effects a transverse cutting action simultaneously with the longitudinal movement of the wallboards and the carriage assembly driven by the wall on conveyor 14 on which the wallboards are disposed.

Referring once again to FIG. 6, it will be noted that at the end limit of the carriage movement comprising a location whereat the plastic film 10 has been completely severed across its entire width in the interval between adjacent plasterboards, the drawbar rollers 52r will eventually drop from upper track 36u through opening 37. At this instant a return means such as coil spring 74 illustrated in FIG. 4, connected to anchor bracket 78, will cause an instantaneous return of the entire carriage assembly to the initial position adjacent the right-hand stanchion 18 in FIG. 1. Spring 74 is also connected to a bracket portion 76 which is welded or otherwise suitably affixed to the transverse carriage member 44. Although a coil spring 74 is illustrated in FIG. 4, equivalent return means such as pneumatic piston and cylinder units or a counterweight will function to equal advantage for purposes of effecting an immediate return of the carriage assembly.

As will be seen from FIG. 6, just prior to the dropping of the drawbar 52 from the upper track 36u to the lower track 36l, knife bar 50 will have climbed by means of ramp 30 onto upper track member 26u through the normally closed gate member 34. Thus, the knife bar 50 will be on the upper track member 26u in the course of the carriage return to the initial starting position, and will be in the proper upper position illustrated in FIG. 5 ready to drop into an underlying interval between two adjacent wallboard members 12 connected by an overlying continuous film 10 in the manner previously described.

Owing to the length of the individual wallboard members as well as the speed of the carriage return, the catch 70 of the catch assembly 62 mounted on the drawbar 52, will always be in the waiting position illustrated in FIG. 2 and ready to snap into the interval between adjacent wallboard members 12, into the position illustrated in FIG. 3. Although only one catch assembly 62 is illustrated in the drawing, it is apparent that two or more may be employed so that two or more points of attachment to the driving edge of the moving wallboard member will be effective for moving the carriage assembly. Similarly, although two knives 56 and their associated parts are illustrated, it is apparent that three or more knives may be employed so that each knife member need only traverse a small section of the film width. The intervals between boards may vary from the ⅛-inch spacing above noted to accommodate various cutting means.

It is believed to be further apparent that although spaced slide plates 13 are illustrated in the drawings for purposes of providing an area wherein the catch assembly 62 may traverse the plane of the conveyor 14, spaced continuous conveyors at the level of conveyor 14 and having an interval therebetween will function equally well. Also, conveyor 14 may be substituted by two spaced continuous conveyors dispensing with the need for a plurality of conveyors or the conveyor depression illustrated in FIG. 6.

Whereas the foregoing description has been specific with respect to the cutting of a decorative vinyl film which may be applied to wallboards having a gypsum core and a paper facing, it is apparent that the apparatus described may function equally well for purposes of cutting a severable covering overlying spaced substrates which are axially moving in the manner described. It is believed apparent from the foregoing description that the apparatus will function in an automatic manner requiring no human agency, and is composed of a small number of basic elements. It is also believed apparent that the apparatus disclosed does not require the use of sophisticated and expensive components, and all elements are normally readily available in the event that replacement is necessary.

I claim:

1. In a film-cutting apparatus for severing a film covering discrete substrates, the combination comprising carriage means axially movable along a predetermined path, film-cutting means connected to said carriage means laterally movable simultaneously in opposite directions along an axis substantially transverse to the axis of carriage means movement in the course of such carriage means axial movement and, catch means adapted to engage the leading edge of a substrate connected to said carriage means and axially movable therewith; said film-cutting means and said catch means lying in a plane substantially transversely disposed to said predetermined path.

2. The apparatus of claim 1 in which guide means supportably engage opposed end portions of said carriage means in the course of the axial movement thereof, and said film-cutting means are movable toward said catch means during the initial portion of said carriage means axial movement and prior to lateral movement thereof in opposite directions.

3. The apparatus of claim 1 in which said catch means is resiliently biased toward said film-cutting means and reciprocally movable in a plane transversely to the axis of carriage means movement.

4. The film-cutting apparatus of claim 1 in which said carriage means is reciprocally movable over said predetermined path, and means engaging said carriage means rapidly to return said carriage means to one end of said predetermined path after said carriage means reaches an opposed end of said path.

5. The film-cutting apparatus to claim 1 in which said film-cutting means comprise two knives attached to knife holders, each knife holder having attached thereto a cam follower, and cams extending along the length of at least a portion of said predetermined path adapted to engage said cam followers thereby forcing said knives to laterally move in opposite directions.

6. In a film-cutting apparatus, the combination comprising a carriage supportably mounted at opposed end portions in first guide means whereby said carriage is axially movable along said first guide means over a predetermined path, yoke means supported by said carriage, movable over said path in the course of said carriage axial movement, film-cutting means movable across said path in the course of said carriage axial movement, support means for said film-cutting means axially driven by said yoke means in the course of said carriage movement, second guide means supportably engaging opposed end portions of said support means for imparting a first movement to said film-cutting means transversely to said predetermined path in the course of a first portion of said carriage movement, and fixedly positioned cam means disposed along said predetermined path for imparting a second movement to said film-cutting means transversely to said predetermined path in the course of said carriage movement.

7. The apparatus of claim 6 in combination with a drawbar axially moving along said predetermined path with said yoke means, and third guide means supportably engaging opposed end portions of said drawbar for imparting a movement to said drawbar transverse to said axial movement in the course of such carriage movement along said predetermined path, and resiliently biased catch means mounted on said drawbar.

8. The apparatus of claim 7 in combination with a substantially horizontal support surface for axially aligned, spaced wallboards or the like adapted to move along said predetermined path, said catch means and film-cutting means lying in substantially the same vertical plane and being disposed on opposite sides of said support surface, and said film-cutting means and catch means being movable toward said support surface by the guide means therefor whereby said cutting means and catch means may enter into the interval between wallboards disposed on said support surface.

9. The apparatus of claim 7 in which said carriage means is supported at opposed ends on blocks slidably mounted on slide rods comprising said first guide means, said support means for said film-cutting means comprises a bar mounted at opposed ends on first track means disposed beneath said first guide means, said first track means comprises a first pair of spaced superposed horizontal tracks connected at opposed ends by connecting ramps, said drawbar is supported at opposed ends on rollers rotatably mounted on second track means disposed beneath said first track means, and said second track means comprises a second pair of superposed horizontal tracks connected at one end by an inclined ramp.

10. The apparatus of claim 9 in which gate means are disposed adjacent each of said ramps and pivotally mounted on the upper horizontal track of said track means.